June 29, 1937.  F. G. PURINTON  2,085,389
MACHINE FOR DECORATING ARTICLES
Filed Nov. 16, 1934   7 Sheets-Sheet 3

Inventor.
Forrest G. Purinton
by Heard Smith & Tennant
Attys.

June 29, 1937.  F. G. PURINTON  2,085,389
MACHINE FOR DECORATING ARTICLES
Filed Nov. 16, 1934  7 Sheets—Sheet 4

Inventor.
Forrest G. Purinton
by Heard, Smith & Tennant.
Attys.

June 29, 1937.  F. G. PURINTON  2,085,389
MACHINE FOR DECORATING ARTICLES
Filed Nov. 16, 1934  7 Sheets-Sheet 6

Inventor.
Forrest G. Purinton
by Heard Smith & Tennant.
Attys.

June 29, 1937.　　　F. G. PURINTON　　　2,085,389
MACHINE FOR DECORATING ARTICLES
Filed Nov. 16, 1934　　　7 Sheets-Sheet 7

Inventor.
Forrest G. Purinton
by Heard Smith & Tennant.
Attys.

Patented June 29, 1937

2,085,389

UNITED STATES PATENT OFFICE 2,085,389

MACHINE FOR DECORATING ARTICLES

Forrest G. Purinton, Waterbury, Conn., assignor to The Patent Button Company, Waterbury, Conn., a corporation of Connecticut Application November 16, 1934, Serial No. 753,360

31 Claims. (Cl. 91—12)

This invention relates to improvements in machines for decorating articles by the application of a band or bands of any desired width to the periphery of the rotating article.

The term "painting" is used herein in the broad sense of applying to the surface of an article a fluid composition, such as enamel, paint, or the like, whether pigmented or not, to decorate or to coat a portion or all of the article.

One of the principal objects of the invention is to provide a machine for applying enamel, paint, or other fluid composition, to the surface of a rotating article, with means to permit a relatively yielding movement between the article and the painting means which will enable the painting means to follow the surface of the rotating article regardless of irregularities in its surface or eccentricity of its rotation.

A further object of the invention is to provide a machine having an article-rotating spindle and a cooperating painting spindle having a painting disk, preferably of thin metal, secured thereon with driving means for each spindle, means for actuating said spindles, and means flexibly connecting one of the spindles to its driving means and yieldable to maintain uniform light contact between the painting disk and the surface of the article during its engagement therewith.

Another object of the invention is to provide a painting machine of the character described, with means enabling the painting disk or disks, or a plurality of painting disks, to apply to the article a series of separated bands, or to merge the bands together in such manner as to coat any desired peripheral area of the article.

More specifically an object of the invention is to provide a machine having means for supporting and rotating an article to be painted, in combination with a painting spindle mounted in and extending loosely through a tubular driving member, means flexibly connecting the central portion of the spindle to the tubular driving member, a painting disk on one end of the spindle positioned to engage the article, and yieldable means, preferably in the form of a counterweight, adjustably mounted on the other end of the spindle for maintaining a light contact between the painting disk and the surface of the article.

Another object of the invention is to provide a machine of the class described having a loading station and a painting station, a series of painting spindles at the painting station each having a painting disk, means for simultaneously rotating the painting spindles, a work carrier having a series of article-supporting spindles mounted therein and movable to present the work to the loading station and painting station, with means for actuating the painting spindles, and means for actuating the article-supporting spindles only at the painting station.

Different forms of mechanism for accomplishing this purpose may be employed. As illustrated in the drawings the rotatable article-supporting spindle may be mounted in a carriage movable from a loading station into the field of the painting station, or the work carrier may comprise an endless carrier having work supporting spindles mounted thereon and movable successively through the loading and painting stations, with a plurality of painting means at the painting station positioned to engage the articles successively as they pass through the field of the painting station.

Another object of the invention is to provide mechanism so constructed as to relieve the article-supporting spindles from engagement with their driving mechanism when located at the loading station or passing through the field thereof.

A further object of the invention is to provide stripping means for simultaneously disengaging the articles from the article-supporting spindles when at the loading station in order that unpainted articles can be applied at said loading station or adjacent thereto and before the article-supporting spindles are engaged by the means for rotating them.

It will therefore be understood that the term "loading station" is used in a broad sense as indicating a station or field at which the articles may be loaded and/or unloaded upon the spindles.

These and other objects and features of the invention will more fully appear from the following description and the accompanying drawings and will be particularly pointed out in the claims.

Illustrative embodiments of the invention are shown in the accompanying drawings, in which.

Several embodiments of the invention are illustrated in the accompanying drawings, in all of which painting disks are flexibly connected to their driving mechanisms in such a manner as to engage the rotating articles with uniform light contact, different means being shown for presenting the articles to the painting disks. In the construction illustrated in Figs. 1 to 7 inclusive, the article-supporting spindles are mounted in a carriage which is movable from a loading station or stations into the field of the painting station and rotated at said painting station, and a series of painting disks are mounted in a carriage which is movable vertically with respect to the article-supporting spindles to bring the painting disks into engagement with the articles at the painting station.

The painting machine shown in Figs. 1 to 7 of the drawings comprises a main frame having pairs of end standards 1 and 2, which may be in the form of angle bars mounted upon the floor 3, each of the pairs being connected by girders 4, preferably in the form of angle bars which support a longitudinally extending rear beam 5 which is also connected to the standards 1 and connects the end frames together. The beam 5 also serves as a support for the special driving mechanism which actuates the article-supporting spindles when the latter are positioned at the painting station. Other longitudinal beams 6 and 7 of narrow width are mounted upon the transverse girders 4 in parallelism with the beam 5, and are more narrowly spaced apart, and are provided with tracks 8 and 9 which support the carriage in which the article-supporting spindles are mounted. Other longitudinally extending parallel beams 10 and 11 are located directly above the beams 7 and 6 and are spaced apart therefrom to provide a guideway for the carriage. The beams 10 and 11 are connected at their ends by a suitable spacing member 12 to maintain them rigidly in their positions.

The carriage for the article-supporting spindles desirably comprises upper and lower parallel plates 13 and 14 which are connected at their ends by heads 15 and 16 having journals for a series of article-supporting spindles 17. Each of these article-supporting spindles is held against longitudinal movement in the carriage by a collar 18 secured to the spindle within the carriage and a preferably cylindrical pulley 19, the end of which abuts against the end 16 of the carriage. The pulleys of all of the spindles of the series are simultaneously driven preferably by the adjacent leads of endless belts 20 and 21 which pass respectively around driving pulleys 22 and 23 at one end of the painting station and around idlers 24 and 25 at the other end of the painting station.

The drive shafts 26 and 27 have secured upon them gears 28 and 29 which mesh with and are driven by a pinion 30 which is mounted upon a shaft 31 preferably located in the vertical plane of the axes 26 and 27 and mounted in the beam 5. The shaft 31 extends through the beam 5 and is journaled in a suitable block or plate 32 which is mounted upon and spaced apart from the rear face of the beam 5. A driving pulley 33 is fixedly secured upon the shaft 31 and is driven by a belt 34 from a pulley 35 mounted upon a shaft 36 having thereon a pulley 37 which is driven by a belt 38 from a suitable driving mechanism, preferably of the variable speed type.

Suitable means are provided for maintaining the leads 20 and 21 of the belts which drive the article-supporting spindles in engagement with each of the pulleys upon the article-supporting spindles. In the particular construction illustrated herein the means for thus maintaining the belts in engagement with the pulley spindles comprises a series of idle pulleys 39 and 40 mounted respectively in frames 41 and 42 located respectively above the lower lead 20 of the upper belt, and beneath the upper lead 21 of the lower belt, the pulleys 39 and 40 in each frame being spaced apart such distance as to engage the belts 20 and 21 intermediate of certain of the pulleys upon the article-supporting spindles when the carriage for the article-supporting spindles is positioned at the painting station.

Suitable means are provided for adjusting the pressure between the idle pulleys 39 and 40 and the belts 20 and 21. In the particular mechanism illustrated resilient bars 43 and 44 extend through the beam 5 and are connected at their rear ends to spacing blocks 32x which are mounted on the outside of the beam 5. The bars 43 and 44 are connected at their inner ends to the frames 41 and 42 respectively. Rods 45 and 46, which extend through the bars 43 and 44, are provided with right and left hand screw threads which engage complementary threads in the bars 43 and 44. These rods are provided at their upper ends with handle members 47 and 48 which may be rotated in a proper direction to force the bars 43 and 44 toward or away from each other, so that the frames 41 and 42, which carry the pulleys, may be forced toward each other, and thereby exert sufficient pressure upon the leads 20 and 21 of the spindle driving belts to maintain them in proper engagement with each of the pulleys 19 upon the article-supporting spindles.

Figure 5:
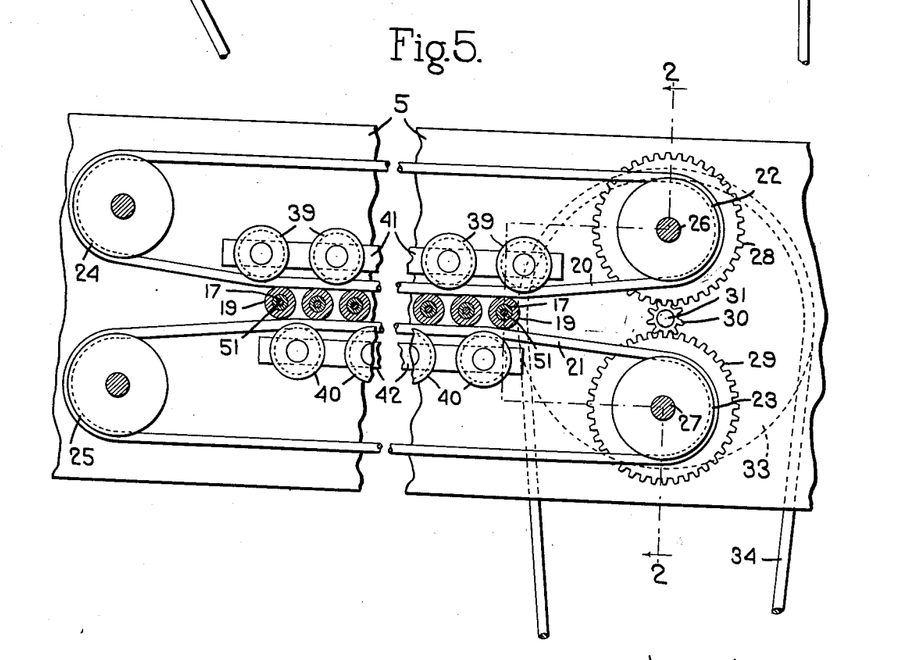
Fig. 5 is a similar transverse sectional view, partly broken away, showing the mechanism for simultaneously driving the article-supporting spindles mounted in the traveling carriage, the section being taken on line 5—5 Fig. 2.

It will be noted with particular reference to Fig. 5 that the leads 20 and 21 of the driving belts which engage the pulleys of the article-supporting spindles are maintained in parallelism throughout the length of the painting station, but diverge from each other at either end of the station as they pass over the pulleys 22 and 23 and the pulleys 24 and 25 so that the article-supporting spindles are rotated only when at the painting station. The diverging end portions of the leads 20 and 21 of the spindle driving belts also enable the carriers for the article-supporting spindles to be more readily moved from the loading station or stations to and from the painting station.

Figure 1:
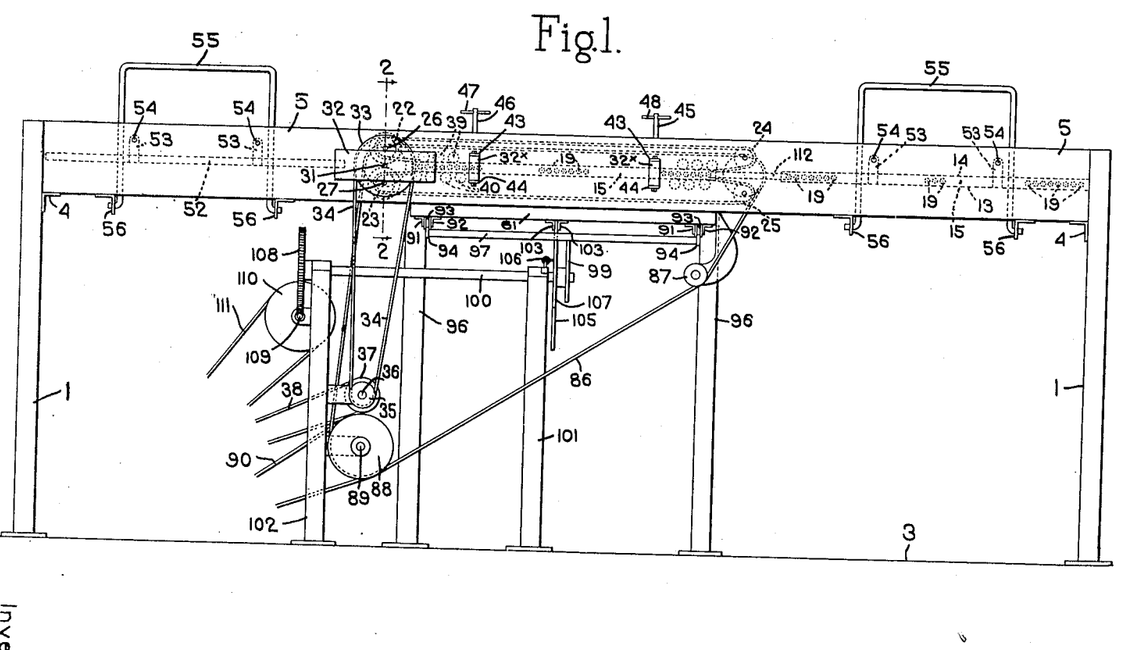
Fig. 1 is a rear elevation of a machine for painting a multiplicity of articles carried by spindles which are mounted in a carriage which is movable into the painting field from either of two loading stations located respectively on opposite sides of the painting field.
Figures 2, 3:
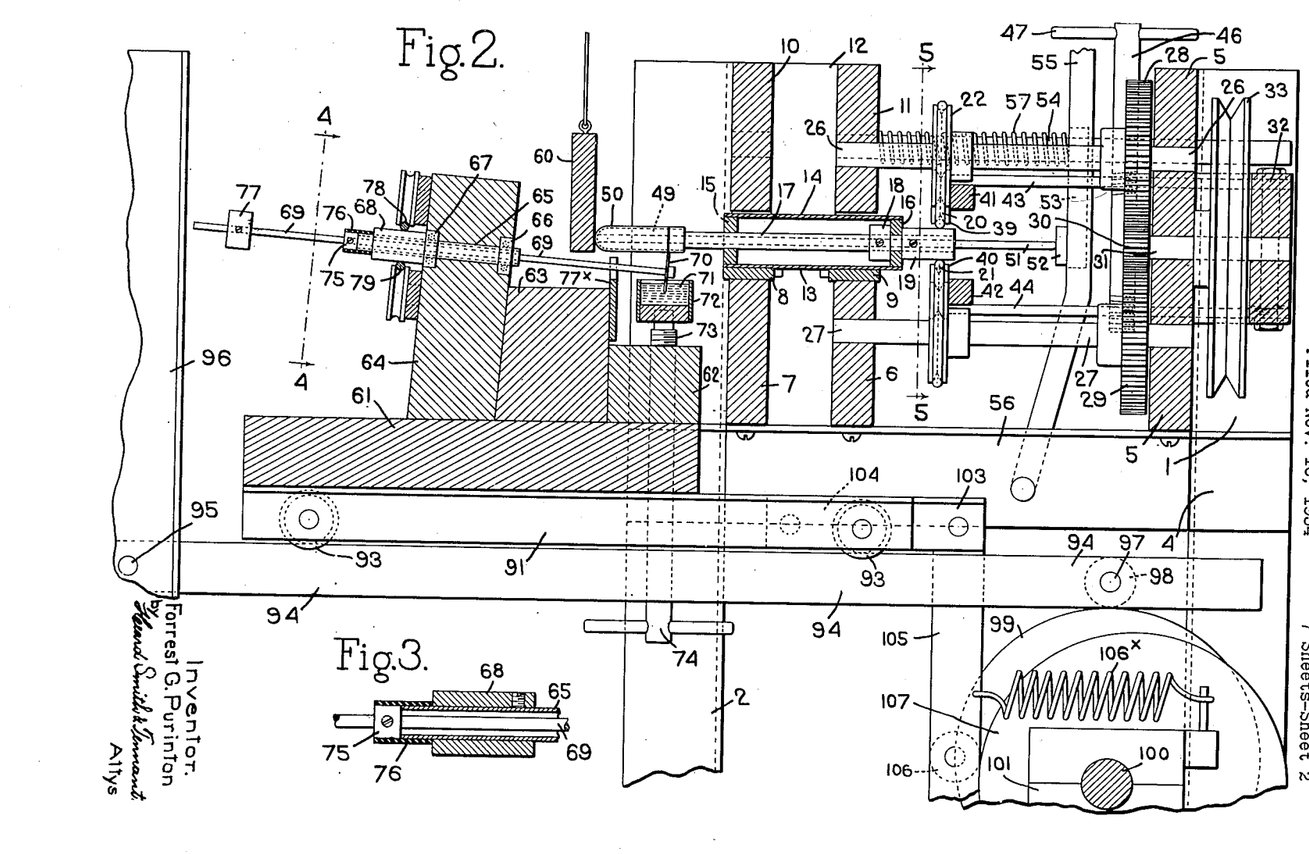
Fig. 2 is an enlarged irregular vertical sectional view of the construction shown in Fig. 1, taken on lines 2—2 Fig. 1 and Fig. 5, the latter figure illustrating the offset portion of the section plane.
Fig. 3 is an enlarged detail view showing the flexible connection between the spindle which carries the painting disk and the sleeve of the driving pulley which actuates the spindle.
Figure 4:
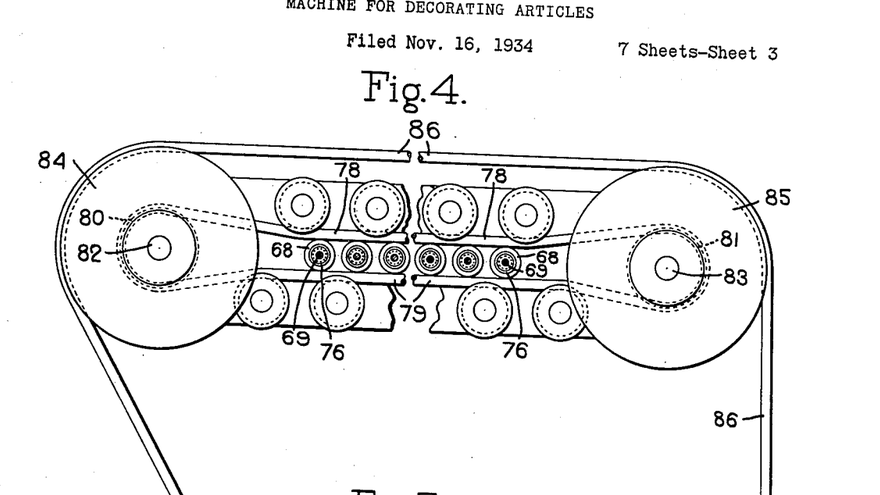
Fig. 4 is an enlarged transverse sectional view, partly broken away, showing the mechanism for simultaneously driving the painting spindles, the section being taken on line 4—4 Fig. 2.
Figures 6, 7:
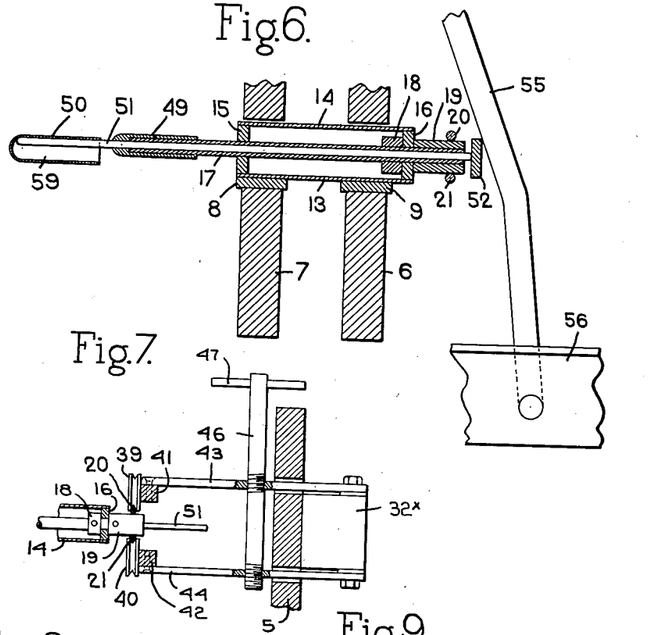
Fig. 6 is a longitudinal sectional view of the traveling carrier and one of the spindles, the guide rails and guides for the carrier, and also illustrating the stripper mechanism supporting the article after it has been stripped from the article-carrying spindle.
Fig. 7 is an enlarged detail view showing the means for adjusting the pressure of the idle pulleys upon the driving belts which actuate the article-carrying spindles to insure proper rotation of all of said spindles.

The preferred form of spindles for supporting the articles is shown more particularly in Figs. 2 and 6. Each of the article-supporting spindles 17 is of tubular form and is mounted in a bearing in the ends 15 and 16 of the carriage. Each spindle desirably has mounted upon its free end a mandrel 49 adapted to fit tightly within the article to be painted, which is illustrated herein as a cylindrical article 50 having a closed spheroidal end. Each of the spindles has reciprocably mounted in and extending through it a stripper 51. When the article is mounted upon the spindle the stripper is withdrawn to the position illustrated in Fig. 2. Means desirably are, however, located at the loading station, which is also an unloading station, for simultaneously removing each of the articles from its spindle. The mechanism for accomplishing this purpose, as illustrated herein, comprises a bar 52, which is located opposite the rear ends of the strippers 51, and is supported by brackets 53 which are secured to rods 54 which are slidably mounted in the beams 5 and 11. The bars 52 at the respective loading stations are actuated by U-shaped handle members 55 the legs of which are pivotally mounted in transverse girders 56 which are secured to the lower edges of the beams 5, 6, and 7. The handle members 55 are offset to present flat faces to engage the stripper-actuating bar 52. Spiral springs 57, which encircle the rods 54 and abut at one end against the beam 11 and at the other end against the brackets 53, normally hold the handle members in retracted position and after a handle member has been actuated to cause the strippers 51 to disengage the articles from the mandrels 49, restore the bar 52 and handle member to retracted position upon release of the handle member. The articles when thus disengaged will be supported upon the strippers.

Any suitable means may be provided for removing the painted articles from the strippers.

Means may be provided for simultaneously retracting all of the strippers after the painted articles have been removed. A convenient mechanism which is shown herein comprises a bar or plate 60 suspended from above by cords or cables in such a manner that it may be raised and lowered and also moved horizontally into engagement with the projecting ends of all of the strippers and pressed rearwardly to force them into the tubular article-supporting spindles, as illustrated in Fig. 2. The bar or plate 60 may also be employed in a similar manner simultaneously to force all the articles to be painted firmly upon the spindles, thereby insuring uniform positioning of all the articles.

One of the principal features of the invention relates to the painting mechanism for applying a stripe or band of enamel, paint, or other material to a rotating article in such manner as to paint the stripe or band uniformly upon the rotating article irrespective of irregularities in the surface of the article or ineffective centering of the article, and particularly to paint such a stripe or band upon the article with clearly defined edges which do not present irregularities.

This is accomplished in the present invention by providing a small thin painting disk, preferably of metal, having its lower portion immersed in a suitable enamel, paint, or other liquid composition, and its upper surface maintained yieldably in engagement with the surface of the article to be painted. Such contact desirably is maintained by so mounting the spindle, which carries the painting disk, which is referred to herein as the painting spindle, or by mounting the work-supporting spindle, flexibly in respect to its driving mechanism. Means are also provided for producing relative movement between the painting spindle and the article-supporting spindle adapted to bring the painting disk into and out of engagement with the surface of the article to be painted.

A preferred embodiment of the invention which is illustrated herein comprises a carriage having mounted thereon a series of spindles each provided with a painting disk and each flexibly connected to a driving mechanism, preferably in axial alinement therewith, with means for raising and lowering the carriage to bring the painting disk into engagement with the articles carried by the respective painting spindles, and means for moving the painting carriage longitudinally of the article-supporting spindles when it is desired to apply to the articles bands of enamel or paint which are wider than the thickness of the painting disk.

In the particular construction illustrated the painting carriage comprises a base 61, of a length somewhat longer than the painting field, having secured to its upper surface longitudinally extending supporting members, such as juxtaposed bars 62, 63, and 64, of progressively increasing height forming a stand for supporting the painting mechanism. In the particular construction illustrated a series of tubular spindle-driving members or sleeves 65 are respectively mounted in ball bearings 66 and 67 in the stand member 64 and suitably secured against longitudinal movement therein. Each of the sleeves 65 has secured to it a preferably cylindrical driving pulley 68. A spindle 69 of smaller diameter than the inner diameter of the sleeve extends axially through the sleeve and is flexibly connected to the sleeve. Each of the spindles 69 has secured to or adjacent one end a small thin painting disk 70, the lower arc of which is immersed in the enamel, paint, or other coating composition 71 contained in a reservoir 72 which extends longitudinally of the painting field and is adjustably supported to enable the proper amount of the lower arc of each disk to be immersed in the coating composition.

In the preferred construction each end of the reservoir 72 is supported upon the end of a screw threaded rod 73 which engages complementary screw threads in the bar 62 and is provided at its lower end with a handle 74 for rotating the screw to produce the desired accurate adjustment.

Suitable means are provided for flexibly connecting each spindle 69 to the surrounding sleeve 65 upon which the driving pulley is mounted, and means are provided for maintaining the painting disk in yielding engagement with the article being painted. In the preferred construction illustrated each of the spindles 69 is provided with a collar 75, preferably of the same diameter of the sleeve 65 and abutting the end of the sleeve which projects beyond the pulley. A rubber tube 76, which is fitted over the collar and the end of the sleeve, provides a flexible connection therebetween.

In order to provide an adjustable yielding pressure of the painting disk upon the article to be painted, the painting spindle 69 extends beyond the collar 75 and has supported upon it an adjustable counterweight 77 so that by adjusting the counterweight 77 toward or from the flexible connection between the collar and the end of the sleeve which forms in effect a pivot, the desired pressure of the disk against the article may be accurately obtained. A plate 77x, which is fixedly secured to the block 63 of the painting carriage, extends longitudinally of the painting field and is provided with a series of vertical guiding slots for the painting spindles 69 which prevents lateral movement of the spindles and the painting disk during the painting operation.

Figure 8:
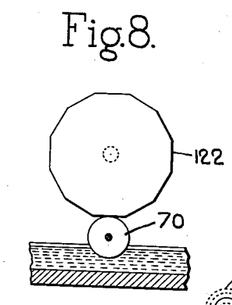
Fig. 8 is a detail view illustrating the painting disk partially immersed in the paint and engaging the irregular surface of an article being painted.

By virtue of this construction and by the use of a painting disk of small diameter the painting disk may be caused to follow accurately the surface of the article, whether of cylindrical form or of other contour, such as a series of straight flat sides, as illustrated in Fig. 8.

The spindles 69 and their driving sleeves 65 desirably are inclined downwardly toward the reservoir 72 so that the spindles 69 may have a greater range of vertical movement than would be possible if the spindles were horizontal, in which case the spindles would be considerably closer to the edge of the reservoir and consequently limited thereby in their downward movement.

Any suitable means may be provided for simultaneously rotating a series of painting spindles at the painting station. In the preferred construction illustrated herein the upper and lower leads 78 and 79 of an endless belt engages diametrically opposite portions of each of the driving pulleys 68 which drive the respective painting spindles 69. The driving belt which engages the pulleys 68 which actuate the painting spindles passes over pulleys 80 and 81 which are fixedly secured respectively on shafts 82 and 83 suitably mounted in the framework of the machine beyond the ends of the painting stations. The shafts 82 and 83 have respectively secured to them driving pulleys 84 and 85 which are actuated by a belt 86 which passes over the pulleys 84 and 85 over a belt-tightening pulley 87 and over a driving pulley 88 mounted upon a shaft 89 supported in a supplemental frame hereinafter to be described.

The shaft 89 is provided with a driving pulley which is rotated by a belt 90 from suitable power transmitting mechanism, preferably of the variable speed mechanism.

The present invention comprises suitable means for causing relative movement between the painting spindles and the article-supporting spindles to bring the painting disk or disks into engagement with the surface of the article to be painted, and to remove it or them therefrom in order that the articles can be conveniently removed. In the present embodiment of the invention shown herein the painting carriage is so mounted that it can be moved vertically with respect to the horizontal plane of the article-supporting spindles to bring the painting disks simultaneously into engagement with the respective articles carried by the article-supporting spindles and to remove the painting disks from engagement therewith. The painting carriage is also so mounted as to permit movement in a direction longitudinally of the spindles in order to apply to the articles bands of paint wider than the thickness of the painting disk.

As illustrated herein pairs of reversely arranged angle iron girders 91 and 92, which are closely juxtaposed, are secured to the under face of the base 61 of the carriage and extend transversely thereof near the ends of the painting carriage and wheels 93 are rotatably mounted between the adjacent vertical flanges of the angle irons 91 and 92. The wheels 93 rest upon rails 94 which are pivoted at their front ends upon studs 95 in uprights 96 extending upwardly from the floor 3 and secured in vertical position in any desired manner.

The rear ends of the bars 94 are connected together by a bar or shaft 97 having mounted centrally thereof a cam follower 98 which rests upon a cam 99 which is secured to the end of a shaft 100 which is mounted in suitable bearings in supplemental frame members or standards 101 and 102 which are secured to and extend upwardly from the floor. The rotation therefore of the cam 99 serves to raise and lower the bars 94 and the painting carriage which is supported thereon, thereby to raise the painting mechanism bodily such distance as will cause the series of painting disks 70 to engage the surfaces of the respective articles to be painted which are carried by the rotating article-supporting spindles 17, and at the end of the painting operation to remove the painting disk from contact with the articles.

It has been mentioned that means are provided to move the painting mechanism longitudinally of the work-supporting spindles for the purpose of applying to the articles bands which are wider than the thickness of the painting disks. In the construction disclosed herein reversely arranged angle iron bars 103 are secured to the under face of the base 61 of the painting carriage and extend transversely of the central portion thereof, and has secured between them a flat plate or bar 104 which projects beyond the end of the carriage and has formed integrally upon it or secured to it a downwardly depending arm 105 provided with a cam follower 106 which is held by a spring 106x against a cam 107 fixedly mounted upon the shaft 100 which supports the cam 99.

By reason of this construction the cams can be maintained in properly timed relation to enable the cam 107 to move the painting carriage endwise a predetermined distance while the painting disks are held in contact with the articles being painted, thereby painting a band of a predetermined width upon the article. By variation in the contours of the cams 99 and 107 a series of stripes and/or bands may be applied to the article, or by the use of suitable cams a continuous coating may be applied to the article.

Any suitable means may be provided for driving the shaft 100 upon which the cams 99 and 107 are mounted. In the construction illustrated herein the shaft 100 is provided with a worm wheel 108 which is driven by a worm upon a shaft 109 having a driving pulley 110 driven from any suitable source, as through a belt 111 from a usual type of variable speed mechanism (not shown).

In the construction illustrated two carriers each having a series of work-supporting spindles are shown, one of the carriers being positioned at the painting station and the other at the loading station at the right end of the machine. These carriers are connected by suitable links 112 so that both carriers may be moved in unison. By reason of this construction the carrier or carriers may be manually moved lengthwise of the machine from the position shown, to remove the carrier supporting the painted articles from the painting field to the loading station at the other end of the machine, and simultaneously to position the carrier having the series of unpainted articles to the loading station. The carrier when positioned at the painting station remains stationary during the painting operation. The other carrier also remains stationary at the loading station while being loaded and until the carriers are again moved lengthwise of the frame to position the freshly loaded carrier at the painting station.

It will be observed by reference particularly to Fig. 5 that the adjacent leads of the driving belts for the article-supporting spindles diverge from each other at each end of the painting station so that rotation of the article-supporting spindles is only produced while the articles are positioned at the painting station.

By reason of this construction the driving belts which rotate the article-supporting spindles may be continuously operated through the driving belt 34. Likewise, in view of the vertical movement of the painting carrier heretofore described, the belts which actuate the painting spindles may also be continuously actuated. By suitable adjustment the relative speeds at which the article-supporting spindles and the painting spindles are rotated may be regulated to apply suitable bands or stripes to articles of different diameters supported upon suitable mandrels upon the article-supporting spindles.

The cam shaft 100 may also be actuated by the use of a proper cam on the shaft 100 driven at a suitable speed through its variable speed actuating mechanism to raise and lower and to move the carrier longitudinally of the work-supporting spindles in properly timed relation to the rotation of the articles.

By virtue of the construction therefore a multiplicity of articles may be painted simultaneously with stripes or bands, or alternating stripes and bands, or otherwise, depending upon the character of the cams employed.

Figure 10:
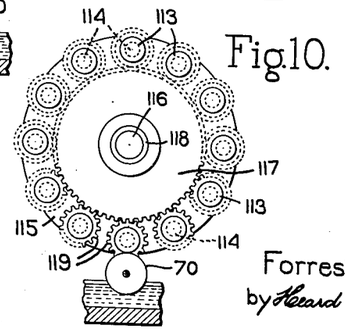
Fig. 10 illustrates a modified form of the invention in which articles mounted upon the traveling carrier are successively presented to a painting mechanism of the type particularly disclosed herein.
Figure 11:
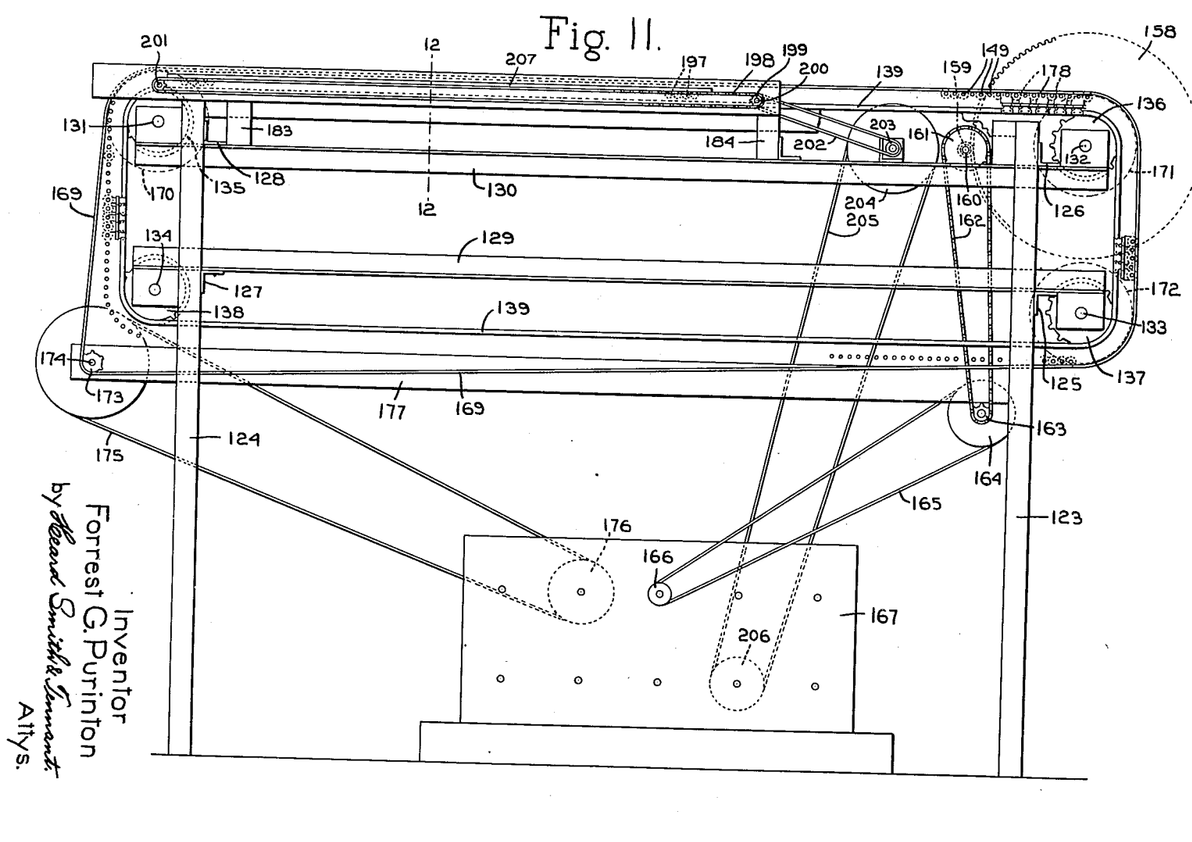
Fig. 11 is a front elevation of a different embodiment of the invention in which the article-supporting spindles are rotatably mounted upon an endless work carrier and carried thereby through the loading and painting fields, and illustrating conventionally a variable speed drive mechanism for actuating the work carrier, the article-supporting spindle rotating means and the paint spindle driving means.

It will be understood that while the invention is disclosed herein as applied to the simultaneous painting of a multiplicity of articles, many features of the invention may be used in other relations, for example, the painting mechanism and the actuating mechanism therefor may be employed to paint the rotating articles of a series in succession, as illustrated in Fig. 10, in which the articles 113 are supported upon suitable spindles 114 mounted circumferentially in a circular carrier 115 carried by a central shaft 116. In this construction a gear 117, which is fixedly secured to a sleeve 118, engages pinions 119 upon the several spindles 114, and suitable mechanism (not shown) is provided to rotate the carrier 115 step by step to position the articles successively into the field of the painting disk 70 which may be flexibly supported upon a suitable stand or carrier at the painting field.

Figure 9:
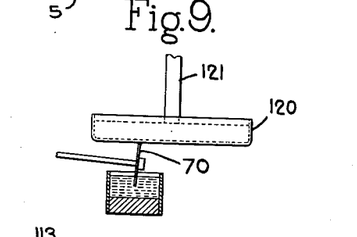
Fig. 9 illustrates an adaptation of the invention as applying a stripe or band to the flat face of a rotating article.

Another adaptation of the invention is illustrated in Fig. 9 in which articles 120 are supported upon suitable mandrels upon a vertical shaft or shafts 121 in such position that the painting disk 70, which may be raised and lowered and actuated in the manner heretofore described, is adapted to be brought into and out of engagement with the flat face of the article 120.

Fig. 8 illustrates graphically an article 122 of non-circular contour which is engaged by a painting disk 70 of such small diameter that by virtue of its resilient support heretofore described will accurately follow the contour of the article 122 and uniformly stripe or band the surface thereof.

Another embodiment of the invention is illustrated in Figs. 11 to 17 inclusive, in which a continuously moving endless work carrier for the rotatable article-supporting spindles is employed to carry the articles successively from a loading and unloading station through the painting field and to return them to the loading and unloading station where they may be disengaged from the spindles by strippers of the character above described, and removed from the strippers in any suitable manner.

The machine illustrated in these figures of the drawings comprises an end frame having vertical standards 123 and 124, the standards 123 being connected together by lower and upper transverse girders 125 and 126, preferably of angle iron, and the standards 124 connected by similar transverse girders 127 and 128. Longitudinally extending upper and lower girders 129 and 130 are connected to and carried by said transverse girders to form the rigid framework and to support the mechanisms hereinafter described. The longitudinally extending girders 129 and 130 have secured at their ends bearing blocks in which are mounted respectively shafts 131, 132, 133, and 134. Sprocket wheels 135, 136, 137, and 138 are mounted upon the respective shafts and support and direct the sprocket chains 139 and 140 of the work carrier. The sprocket chains 139 and 140 are of identical construction comprising parallel links 141 having their adjacent ends connected by pins 142 upon which spacing rollers 143 are preferably mounted and are of such size as to be engaged by the teeth of the sprocket wheels. The links of each pair of parallel links are provided with oppositely disposed angle iron brackets 144 and 145 which support plates or lags 146 upon which an article-supporting spindle is mounted.

Figures 12, 13, 14:
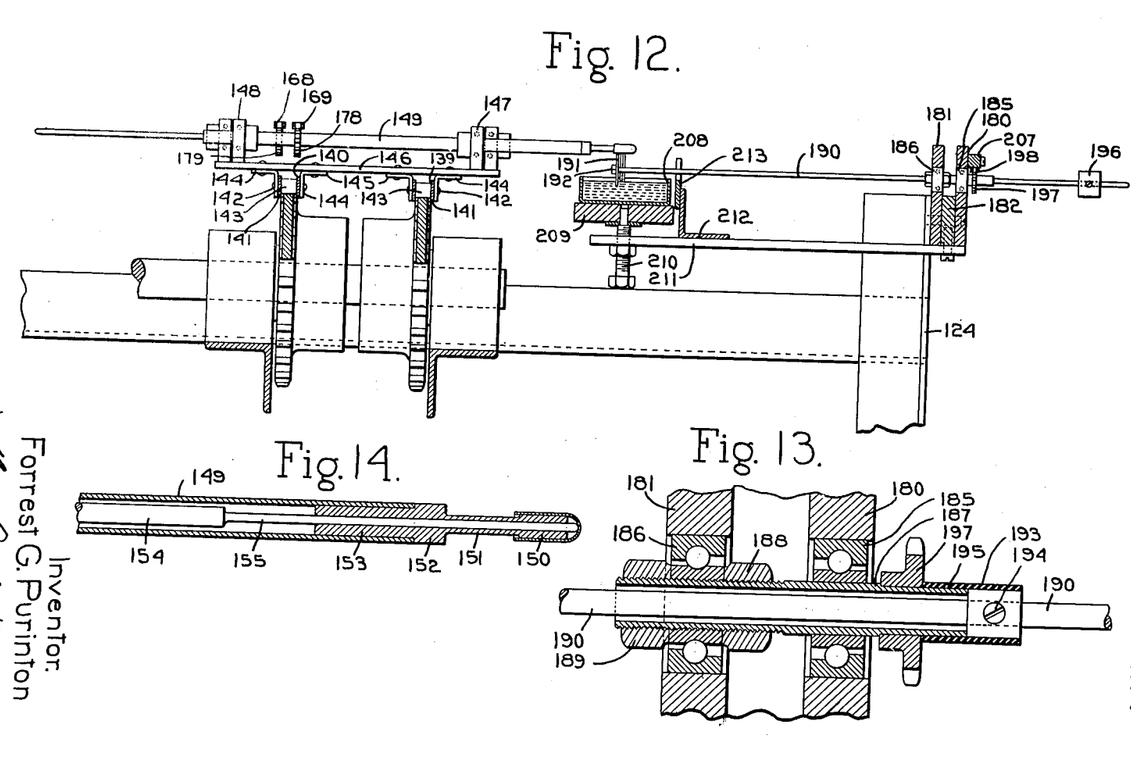
Fig. 12 is an enlarged sectional view on the dot and dash line 12—12 Fig. 11, showing the relative positions of the work carrier with the rotatable article-supporting spindles mounted thereon, the painting disks, and the means for rotating the same.
Fig. 13 is an enlarged detail sectional view showing the manner in which the painting spindles are flexibly connected to tubular driving members which are mounted in ball bearings in the frame of the machine.
Fig. 14 is an enlarged detail view in vertical section of a work-carrying spindle, the chuck for supporting the article, and the stripper for disengaging the article from the chuck.
Figure 15:
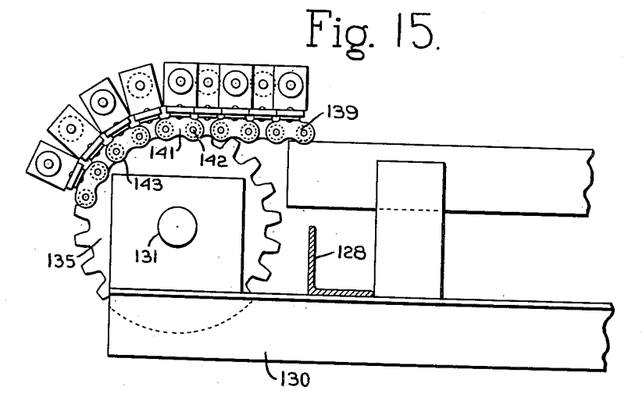
Fig. 15 is an enlarged detail view showing the manner in which the article-supporting spindles are mounted upon an endless chain work carrier.

Each of the plates or lags 146 has secured to it a pair of bearing blocks 147 and 148 provided with ball bearings in which a hollow work-carrying spindle 149 is mounted. Each of the spindles preferably is provided at one end with a mandrel or chuck 150 upon which the article to be painted may be removably secured, as illustrated in Fig. 14. In order to provide for properly holding articles of different sizes the mandrel or chuck may comprise an enlarged end portion which may be split longitudinally and expanded to fit the barrel of the article, a relatively smaller hollow cylindrical portion 151 and an enlarged head portion 152 having a reduced shank 153 adapted to fit tightly within the end of the hollow spindle 149. Each of the article-carrying spindles desirably is provided with a stripper 154 extending axially therethrough and having a reduced portion 155 slidably fitting in the axial bore of the mandrel or chuck member 150, the stripper being movable longitudinally of the spindle to disengage the painted articles therefrom, as heretofore described.

Figure 16:
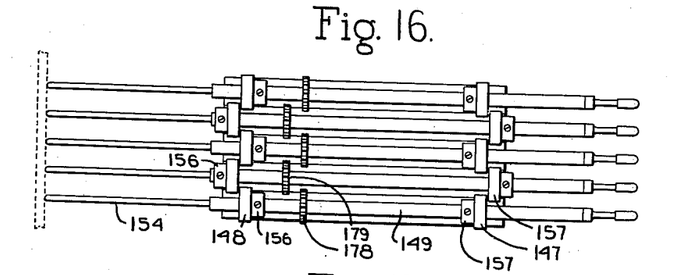
Fig. 16 is a detail plan view showing the staggered arrangement of several work-carrying spindles and the manner in which they are mounted to enable them to be arranged closely together; and, Fig. 17 is an enlarged detail view showing the driving mechanism for the painting spindles.
Figure 17:
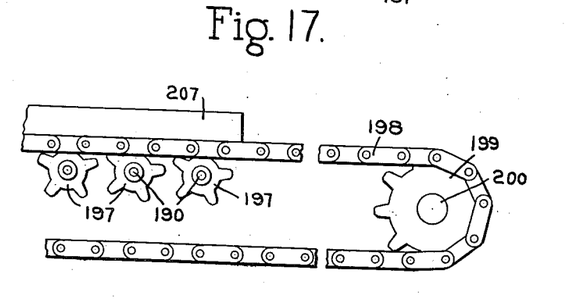

In order to permit the several spindles of the work carrier to be arranged in close juxtaposition, the bearing blocks 147 and 148 of adjacent spindles are arranged in alternately staggered relation, as illustrated in Fig. 16. In order to secure the hollow spindles against longitudinal movement in the bearings, alternating spindles have secured to them collars 156 and 157, the collars upon alternating spindles abutting respectively against the outside and inside faces of the narrowly spaced and more widely spaced bearing blocks for adjacent spindles, as is clearly shown in Fig. 16.

Any suitable means may be provided for actuating the endless work carrier. As illustrated herein the sprocket wheel 136 is fixedly secured to the shaft 132 and the shaft 132 has secured to it a large gear 158 which is engaged by a pinion 159 mounted upon a shaft 160 journaled in suitable bearings carried by the frame, and the shaft 160 is provided with a sprocket wheel 161 which is driven by a sprocket chain 162 from a sprocket wheel 163 which is mounted upon a shaft having a driving pulley 164 driven by a belt 165 from a pulley 166 actuated by a member of a variable speed driving mechanism of any suitable type, the variable speed mechanism being indicated diagrammatically by the rectangular casing 167 which is shown as mounted beneath the machine in Fig. 11.

Suitable means are provided for rotating the article-carrying spindles while in the field of the painting station, which, as illustrated herein, is within the length of the upper lead of the endless work carrier. The rotation of the article-carrying spindle is accomplished by parallel endless sprocket chains 168 and 169 which pass over idle sprockets 170 mounted upon the shaft 131, thence over idle sprockets 171 rotatably mounted upon the shaft 132, thence over idle sprockets 172 mounted upon the shaft 133, and over driving sprockets 173 of smaller diameter which are fixedly secured to a shaft 174 which is driven by a belt or sprocket chain 175 from a pulley 176 which is actuated by a member of the variable speed driving mechanism. The shaft 174 is mounted upon the end portion of a beam 177 which is secured to the framework in any suitable manner.

The alternating article-carrying spindles are provided respectively with sprockets 178 and 179 adapted to be engaged respectively by the sprocket chains 168 and 169. By reason of this construction all of the article-carrying spindles are rotated at a uniform speed.

The upper leads of the sprocket chains 168 and 169 for driving the article-supporting spindles are in parallelism with the upper lead of the work carrier and so arranged as to engage the sprockets 178 and 179 throughout the entire length of the upper lead of the endless work carrier.

The beam 177, which carries the driving sprocket 173 for the sprocket chains which actuate the article-carrying spindle, is located at a considerable distance below the lower lead of the endless work carrier 139, so that the lower leads of the sprocket chains 168 and 169 will be depressed out of engagement with the sprockets 178 and 179 on the article-carrying spindles, thereby permitting the spindles to come to rest along the lower lead of the work carrier, thereby permitting the actuation of the strippers to remove the articles from the spindles when they are not rotating, and the assemblage of the articles to be painted thereon, it being understood that such operation takes place at the loading station.

Any suitable means may be provided for actuating the strippers to disengage the articles from the respective mandrels or chucks while passing through the field of the loading station.

The painting mechanism may be and desirably is in most respects similar to that hereinabove illustrated and described. In the construction as more particularly shown in Figs. 11, 12, and 13, the painting spindle supporting means comprises parallel beams 180 and 181 which are spaced apart by a narrow beam 182 and mounted upon standards 183 and 184 supported by the longitudinal girders 130. The end portion of these beams may also be secured to the upper end of the standard 124 of the main frame.

Suitable pairs of alined ball bearings 185 and 186 are mounted in the beams 180 and 181. A tubular driving member for each of the painting spindles extends through and is secured to the inner race of each ball bearing. In the preferred construction illustrated in Fig. 13 the tubular driving member 187 extends through the inner race of the ball bearing 185 and is secured thereto and also extends through the inner race of the ball bearing 186 and is secured thereto by a screw threaded connection, nuts 188 and 189 being mounted upon the screw threaded portion of the tubular driving member on opposite sides of the ball bearing 186 and abutting against the inner race thereof to prevent longitudinal movement of the tubular driving member in the bearings.

The painting spindle 190 is of considerably smaller diameter than the internal diameter of the tubular driving member and extends axially therethrough. It is provided at one end with a reduced end portion upon which the painting disk 191, which preferably is a small thin metallic disk, is detachably secured by a suitable nut 192. The spindle 190 is provided adjacent the outer end of the tubular driving member with a collar 193, preferably of the same diameter as the external diameter of the driving member, and is secured thereto by a screw 194. A flexible resilient sleeve 195, preferably of rubber, is fitted tightly over the collar 193 and the end portion of the tubular driving member 187, thereby providing a flexible and resilient connection of the character heretofore described.

The end of the spindle 190, which projects beyond this flexible connection, is provided with a counterweight 196 which may be adjustably secured thereon to give the desired light pressure of the painting disk upon the article to be painted. The collars 193 upon the respective painting spindles 190 may be so positioned that successive painting disks are slightly out of alinement to produce stripes wider than could be produced by a single painting disk. By thus positioning the painting disks on adjacent spindles the enamel or paint applied by successive painting disks will merge to produce a band of the desired width according to the number of painting disks so positioned out of alinement. Narrow or wide bands may be produced by utilizing different numbers of the painting disks which, as above stated, are detachably secured to the ends of the painting spindles.

Any suitable means may be provided for simultaneously driving all of the painting spindles of the series. In the construction illustrated herein each of the tubular driving members has secured to it a sprocket wheel 197 which is engaged by the upper lead of an endless sprocket chain 198 which passes around a driving sprocket 199 upon a shaft 200, and also around an idle sprocket 201. The shaft 200 of the driving sprocket is actuated by a belt or sprocket chain 202 which is driven from a pulley 203 on a shaft which is mounted in suitable bearings supported by the side frames and is provided with a pulley 204 which in turn is driven by an endless belt or chain 205 from a pulley or sprocket 206 which is actuated by a member of the variable speed driving mechanism.

In order to insure continuous engagement of the upper lead of the sprocket chain 198 with the sprocket 197 of the tubular spindle driving members a plate 207 is mounted upon the beam 180 to overlie the upper lead of the sprocket chain 198 and hold it at all times in engagement with each of the sprockets 197 of the spindle driving members.

Any suitable means may be provided for supplying enamel or paint to the painting disks. As illustrated herein a reservoir 208, which extends the full length of the painting field, is mounted upon a suitable support 209 which is carried by adjusting screws 210 extending through bars 211 which are secured at their ends to the composite beam formed of the beam members 181 and 182. In order to prevent the painting spindles from lateral movement an angle iron bracket 212 is mounted upon the bars 211 and has secured to it a vertically slotted guide plate 213 provided with vertical slots through which the painting spindles 190 extend, and which serve as guides to insure vertical movement only of the painting disks. By suitable adjustment of the screws 210 the lower arcs of the painting disks may be submerged to any desired depth in the enamel or other painting composition.

In the operation of the machine the articles to be painted are applied to the mandrels or chucks at the loading station and are carried by the continuously moving endless carrier upwardly and thence horizontally along the upper lead of the carrier into the field of the painting mechanism. After the articles pass through the painting field and are engaged by the painting disks in the manner above described they are carried downwardly along the lower lead of the work carrier to the loading station at which the strippers are actuated to remove the articles from the spindles. While passing through the painting field the article-carrying spindles are rotated by the sprocket chains 168 and 169 which engage respectively sprockets upon alternating spindles. Such engagement continues through the entire upper lead of the work carrier but after the sprocket chains 168 and 169 have passed over the pulleys 172 the driving sprocket chains 168 and 169 are carried downwardly on their lower leads sufficiently to disengage them from operative relation to the sprockets 178 and 179 on the article-carrying spindles, thereby permitting the spindles to cease rotation while at the painting field. While passing through the painting field the articles are successively engaged by the painting disks which are held against them with a light yielding pressure adapting the disks thereby to follow the contour of the articles and to produce stripes of uniform width thereupon.

It will be understood that the various embodiments of the invention particularly shown and described herein are of an illustrative character and that various changes in form, construction and arrangement of parts may be made within the spirit and scope of the following claims.

Having thus described the invention, what is claimed as new, and desired to be secured by Letters Patent, is:

1. A machine of the class described comprising means for supporting and rotating an article to be decorated, a substantially horizontal painting spindle having a painting disk adjacent one end thereof, a substantially horizontal tubular driving member coaxial with said spindle located at a distance from said painting disk loosely and concentrically surrounding said spindle and mounted in suitable bearings, a flexible sleeve connecting said painting spindle to said tubular driving member, yieldable means acting upon said spindle to maintain uniform light contact between said painting disk and the surface of said article, means for guiding said spindle vertically and means for actuating said driving member.

2. A machine of the class described comprising means for supporting and rotating an article to be decorated, a substantially horizontal painting spindle mounted in and extending loosely through a substantially horizontal tubular driving member of larger diameter which is journaled in suitable bearings, a flexible sleeve connecting said spindle to said tubular driving member, a painting disk on one end portion of said spindle adapted to engage said rotating article, and a counterbalancing weight adjustably mounted upon the other end portion of said spindle and means for guiding said spindle vertically.

3. A machine of the class described comprising means for supporting and rotating an article to be decorated, a substantially horizontal painting spindle mounted in and extending loosely through a substantially horizontal tubular driving member of larger diameter which is journaled in suitable bearings, means flexibly connecting the central portion of said spindle to said tubular driving member comprising a collar on said spindle and a resilient sleeve embracing said collar and an end portion of said tubular driving member, a painting disk on one end portion of said spindle adapted to engage said rotating article, a counterbalancing weight adjustably mounted upon the other end portion of said spindle and a plate having a slot therein engaging said spindle intermediate of said driving member and said painting disk for guiding said spindle vertically.

4. A machine of the class described having a loading station and a painting station, a horizontal series of painting spindles at said painting station each having a thin metallic painting disk, means for simultaneously rotating said painting spindles, a reservoir containing liquid immersing the lower portion of all of said disks, a work carrier having a series of article-supporting spindles mounted therein and movable horizontally to present the work to said loading station and said painting station, actuating means for simultaneously rotating said article-supporting spindles when at said painting station, means for causing yieldable engagement between said painting disks and said articles when at said painting station and means for simultaneously rotating all of said painting disks.

5. A machine of the class described having a loading station and a painting station, a horizontal series of painting spindles at said painting station each having a thin metallic painting disk, means for simultaneously rotating said painting spindles, a reservoir containing liquid immersing the lower portion of all of said disks, a work carrier having a series of article-supporting spindles mounted therein and movable horizontally to present the work to said loading station and said painting station, actuating means for simultaneously rotating said article-supporting spindles when at said painting station, means for simultaneously rotating all of said painting disks, and means for removing said actuating means from operative relation to said article-carrying spindles when at said loading station.

6. A machine of the class described comprising a main frame, a horizontal series of article-supporting spindles movably mounted on said frame, means for rotating said article-supporting spindles, painting means comprising a horizontal series of spindles each spindle having a thin metallic painting disk of small diameter secured to the end portion thereof, means for moving said article-supporting spindles simultaneously to present an article to each painting disk, and yieldable means acting upon the respective painting spindles to maintain a uniform light contact between each painting disk and the rotating article during the engagement thereof, whereby a narrow line of paint will be applied to said article.

7. A machine of the class described comprising a loading station and a painting station, a horizontal series of parallel painting spindles at said painting station each having a thin metallic painting disk, means for simultaneously rotating said painting spindles, a horizontally movable carrier having a series of article-supporting spindles movable in a path in parallelism with and in proximity to said painting disks, and operable to carry the article-supporting spindles from the loading station to and from the painting station and to present said articles simultaneously to the respective painting disks, and means for rotating said article-supporting spindles at said painting station.

8. A machine of the class described comprising a loading station and a painting station, a horizontal series of painting spindles at said painting station each mounted in a tubular driving member and flexibly connected thereto and provided with a painting disk, an endless actuating member engaging all of said tubular driving members, a work carrier having a series of article-supporting spindles movable in a horizontal path parallel to said series of painting spindles to present the articles to said painting disks, a driving member on each of said article-supporting spindles, and an endless actuating member engaging the driving members of each of said article-supporting spindles when in the field of said painting station, but free from engagement therewith when at said loading station.

9. A machine of the class described comprising a loading station and a painting station, a series of painting spindles at said painting station each mounted in a tubular driving member and flexibly connected thereto and provided with a painting disk, an endless actuating member engaging and rotating all of the tubular driving members for said painting spindles, a work carrier having a series of tubular article-supporting spindles movable in a path parallel to said series of painting spindles to present the articles to said painting disks, strippers mounted in the respective tubular article-supporting spindles, a driving member on each of said article-supporting spindles, an endless actuating member engaging and rotating the driving members of each of said article-supporting spindles when in the field of said painting station, but free from engagement therewith when at said loading station, and means at said loading station to move said strippers longitudinally of said tubular article-supporting spindles to disengage the articles therefrom.

10. A machine of the class described comprising a loading station and a painting station, a series of painting spindles at said painting station each mounted in a tubular driving member and flexibly connected thereto and provided with a painting disk, an endless actuating member engaging and rotating all of the tubular driving members for said painting spindles, a work carrier having a series of tubular article-supporting spindles movable in a path parallel to said series of painting spindles to present the articles to said painting disks, strippers mounted in the respective tubular article-supporting spindles, a driving member on each of said article-supporting spindles, an endless actuating member engaging and rotating the driving members of each of said article-supporting spindles when in the field of said painting station, but free from engagement therewith when at said loading station, means at said loading station to move said strippers longitudinally of said tubular article-supporting spindles to disengage the articles therefrom, and means for simultaneously removing a plurality of said articles from said strippers at said loading station.

11. A machine of the class described comprising a loading station and a painting station, painting means at said painting station, a work carrier having a series of horizontal tubular article-supporting spindles rotatably mounted therein each provided with a driving member and operable to present the articles at said painting and loading stations, endless actuating means arranged to engage and rotate said driving members when in the field of said painting station, but to be disengaged from the respective driving members when the article-supporting spindles are in the field of said loading station, strippers slidably mounted in the respective tubular article-supporting spindles, and means at said loading station including a manually movable bar operable simultaneously to move a plurality of said strippers longitudinally thereby simultaneously to disengage the articles from said supporting spindles.

12. A machine of the class described comprising a loading station and a painting station, a work carrier having a series of tubular article-supporting spindles rotatably mounted therein each provided with a driving member and operable to present the articles at said painting and loading stations, strippers slidably mounted in the respective tubular spindles, endless actuating means arranged to engage and rotate said article-supporting spindle driving members when in the field of said painting station, but to be disengaged from the respective driving members when the article-supporting spindles are in the field of said loading station, a series of painting spindles at said painting station each mounted in a tubular driving member and flexibly connected therewith and provided with a painting disk adapted to engage an article on said article-supporting spindle, an endless actuating member continuously engaging all of the tubular driving members for said painting spindles, and means at said loading station for actuating a plurality of said strippers to disengage the articles therefrom.

13. A machine of the class described comprising a loading station and a painting station, a horizontal series of painting means at said painting station, a substantially horizontal endless work carrier having a series of article-supporting spindles mounted therein having driving members, means for actuating said endless work carrier to move the articles successively through the fields of said painting and loading stations, a horizontal endless spindle-actuating member having a lead positioned to engage and rotate the driving members of said article-supporting spindles when in the field of said painting means, and means for guiding said endless spindle-actuating member for the article-supporting spindles out of engagement with the driving members of said spindles when the latter are passing through the field of said loading station.

14. A machine of the class described comprising a horizontal endless work carrier having a series of article-supporting spindles mounted therein, means for actuating said endless work carrier to move the articles successively through the fields of said painting and loading stations, means for rotating said article-supporting spindles when at said painting station, but not at said loading station, a horizontal series of rotatable painting spindles at said painting station each having a thin painting disk thereon, the disks on the respectice spindles being so positioned as to engage successively different portions of the article passing through the painting field, and means for simultaneously rotating said painting spindles.

15. A machine of the class described comprising a loading station and a painting station, an endless work carrier having a series of tubular article-supporting spindles mounted therein having driving members, strippers slidably mounted in said tubular spindles, means for actuating said endless work carrier to move the articles successively through the fields of said painting and loading stations, an endless actuating member having a lead engaging and rotating the driving members of each of said article-supporting spindles when in the field of said painting station, means for guiding said endless actuating member out of engagement with the driving members of said spindles when the latter are passing through the field of said loading station, a series of painting spindles at said painting station each mounted in and extending through a tubular driving member, means flexibly connecting the central portion of said spindle to said tubular driving member comprising a collar on said spindle and a resilient sleeve embracing said collar and an end portion of said tubular driving member, a painting disk on one end portion of said spindle adapted to engage the rotating article, and a counterweight adjustably mounted on the other end portion of said spindle, an endless actuating member engaging each of the tubular driving members of said painting spindles, and means at said loading station to move said strippers longitudinally thereby to disengage the articles from said strippers.

16. A machine of the class described comprising a loading station and a painting station, an endless work carrier having a series of tubular article-supporting spindles mounted therein having driving members, strippers slidably mounted in said tubular spindles, means for actuating said endless work carrier to move the articles successively through the fields of said painting and loading stations, an endless actuating member having a lead engaging and rotating the driving members of each of said article-supporting spindles when in the field of said painting station, means for guiding said endless actuating member out of engagement with the driving members of said spindles when the latter are passing through the field of said loading station, a series of painting spindles at said painting station each mounted in and extending through a tubular driving member, means flexibly connecting the central portion of said spindle to said tubular driving member comprising a collar on said spindle and a resilient sleeve embracing said collar, and an end portion of said tubular driving member, a painting disk on one end portion of said spindle adapted to engage the rotating article, and a counterweight adjustably mounted on the other end portion of said spindle, an endless actuating member engaging each of said tubular driving members, means at said loading station to move said strippers longitudinally thereby to disengage the articles from said strippers, and variable speed mechanism operable to control the speed of rotation of said painting spindles and said article-supporting spindles and the rate of movement of said work-carrying means.

17. A machine of the class described comprising a main frame, a horizontal series of article-supporting spindles carried by said main frame, means for simultaneously rotating said article-supporting spindles, a painting carriage movably mounted on said main frame, a complementary horizontal series of painting spindles each yieldably mounted on said painting carriage and having a small thin painting disk, means for simultaneously rotating said painting spindles, means for moving said painting carriage bodily upwardly with respect to said article-supporting spindles simultaneously to cause the respective painting disks simultaneously to engage the articles supported on the respective article-supporting spindles, and means for gradually moving said painting carriage longitudinally of said article-supporting spindles during the engagement of the disks with said articles.

18. A machine of the class described comprising a main frame, a series of article-supporting spindles carried by said main frame, means for rotating said article-supporting spindles, a painting carriage, a complementary series of painting spindles yieldably mounted in said carriage each having a thin rigid paint-applying disk, a movable support for said carriage, a cam beneath said support engaging said movable support operable to raise said carriage to cause said painting disks to engage the respective articles, and a cam engaging said carriage operable to move said carriage longitudinally of said article-supporting spindles during the engagement of the disks with said articles.

19. A machine of the class described comprising a main frame, a series of horizontal article-supporting spindles carried by said main frame, means for rotating said spindles, a painting carriage carried by said main frame, a series of driving sleeves complementary to said article-supporting spindles mounted in said carriage and inclined downwardly with respect to the horizontal plane of the article-supporting spindles, means for simultaneously rotating said driving sleeves, a spindle of relatively smaller diameter extending through each of said sleeves and flexibly connected to said sleeve and having at one end a small thin metallic painting disk to engage an article upon a complementary article-supporting spindle, counterbalancing means for each of said spindles to maintain uniform contact of the disk with the surface of the article during its rotation, a paint reservoir mounted on said painting carriage, and means for adjusting said reservoir to cause the disks to be partially immersed in the paint therein.

20. A machine of the class described having a painting station and a loading station at each side thereof, comprising a main frame, a painting carriage supported thereby having a series of painting spindles rotatably mounted therein each provided with a thin metallic painting disk of small diameter, means for simultaneously rotating the spindles, a plurality of work carriers reciprocably mounted on said main frame and movable alternately from a loading station to said painting station, each of said work carriers having a series of article-supporting spindles complementary to said painting spindles, and means for rotating said article-supporting spindles only when positioned at said painting station.

21. A machine of the class described having a painting station and a loading station, comprising a main frame, a substantially horizontal series of painting spindles supported by said main frame each having a thin metallic painting disk thereon, means for simultaneously rotating said painting spindles, a work carrier having a complementary series of article-supporting spindles and movable from said loading station to said painting station to position the article-supporting spindles in cooperative relation to the respective painting disks, means for simultaneously rotating said article-supporting spindles at said painting station, and yieldable means acting upon each spindle to cause each disk to contact lightly and uniformly with the article upon the complementary article-supporting spindle while at said painting station.

22. A machine of the class described having a painting station and a loading station, painting means at said painting station comprising a series of painting spindles each having a thin metallic painting disk thereon, means for simultaneously rotating said painting spindles, a work carrier having a complementary series of article-supported spindles and movable from said loading station to said painting station to position the article-supporting spindles in cooperative relation to the respective painting disks, means for simultaneously rotating said article-supporting spindles at said painting station, means for causing each disk to contact lightly and uniformly with the article upon the complementary article-supporting spindle, and means for simultaneously removing all the articles from said article-supporting spindles at said unloading station.

23. A machine of the class described having a painting station and a loading station, painting means at said painting station comprising a series of painting spindles each having a thin metallic painting disk thereon, means for simultaneously rotating said painting spindles, a work carrier having a complementary series of tubular article-supporting spindles having strippers slidably mounted therein and movable from said loading station to said painting station to position the article-supporting spindles in cooperative relation to the respective painting disks, means for simultaneously rotating said article-supporting spindles at said painting station, and means for causing each disk to contact lightly and uniformly with the article upon the complementary article-supporting spindle, and means at said loading station operable simultaneously to move said strippers longitudinally of said article-supporting spindles thereby to remove all of the articles from said spindles at once.

24. A machine of the class described comprising a main frame having a painting station, a painting carriage at said painting station, a substantially horizontal series of parallel spindles mounted in said carriage each provided with a driving pulley and with a small thin metallic painting disk, means for supplying paint to said disks, an endless belt having its upper and lower horizontal leads engaging diametrically opposite portions of each of said driving pulleys, means for driving said endless belt thereby simultaneously to rotate all of said painting spindles, and means for simultaneously presenting a series of articles to be painted to said painting disks.

25. A machine of the class described comprising a main frame having a painting station, a painting carriage at said painting stations, a substantially horizontal series of parallel spindles mounted in said carriage each provided with a driving pulley and with a small thin metallic painting disk, means for supplying paint to said disks, an endless belt having its upper and lower leads engaging diametrically opposite portions of each of said driving pulleys, means for driving said endless belt, a series of idle pulleys engaging respectively the upper and lower leads of said endless belt acting to insure engagement thereof with all of said driving pulleys, and means for simultaneously presenting a series of articles to be painted to said painting disks.

26. A machine of the class described having a painting station and a loading station, painting means at said painting station comprising a substantially horizontal series of parallel spindles having small rigid painting disks thereon, means for simultaneously rotating the painting spindles, a work carrier horizontally movable from said loading station to said painting station having mounted therein a series of article-supporting spindles complementary to said painting spindles, a driving pulley upon each of said article-supporting spindles, upper and lower endless belts having leads respectively engaging diametrically opposite portions of each of the driving pulleys of said article-supporting spindles when positioned at said painting station, and means for actuating said endless belts thereby simultaneously to rotate all of said article-supporting spindles.

27. A machine of the class described having a painting station and a loading station, painting means at said painting station comprising a substantially horizontal series of parallel spindles having small rigid painting disks thereon, means for simultaneously rotating the painting spindles, a work carrier horizontally movable from said loading station to said painting station having mounted therein a series of article-supporting spindles complementary to said painting spindles, a driving pulley upon each of said article-supporting spindles, upper and lower endless belts having leads respectively engaging diametrically opposite portions of each of the driving pulleys of said article-supporting spindles when positioned at said painting station, means for actuating said endless belts thereby simultaneously to rotate all of said spindles, means for insuring engagement of said endless belts with all of said pulleys comprising movable supports having idlers engaging opposite faces of the pulley-engaging leads of said endless belts, and means for simultaneously adjusting said supports.

28. A machine of the class described comprising a loading section and a painting station, painting means at said painting station, a work carrier having a series of horizontal tubular article-supporting spindles rotatably mounted therein each provided with a driving member and operable to present the articles at said painting and loading stations, endless actuating means arranged to engage said driving members when in the field of said painting station and thereby rotate said article-carrying spindles, but to be disengaged from said driving means when the article-supporting spindles are in the field of said loading station, strippers slidably mounted in the respective tubular spindles, a horizontal bar positioned to engage the ends of said strippers when in retracted position, a manually operable handle member for moving said bar to cause said strippers to disengage the articles from the article-supporting spindles, resilient means for restoring said bar to normal position, and a suspended plate positioned to engage the opposite ends of said spindles and operable to force them inwardly to retracted position.

29. A machine of the class described having a painting station and a loading station upon each side of said painting station, painting means at said painting station comprising a substantially horizontal series of parallel spindles having painting disks thereon, means for simultaneously rotating said painting spindles, a plurality of horizontally movable work carriers connected together and so spaced apart that when one carrier is positioned at the painting station the other carrier is positioned at the loading station, a series of article-supporting spindles complementary to said painting spindles mounted in each carrier, a driving pulley upon each of said article-supporting spindles, upper and lower endless belts having leads respectively engaging diametrically opposite portions of each of the driving pulleys of a series of article-supporting spindles when positioned at said painting station, and means for actuating said endless belts simultaneously to rotate all of the article-supporting spindles when at the painting station.

30. A machine of the class described comprising a loading station and a painting station, horizontal series of closely juxtaposed painting spindles at said painting station each having a thin painting disk and each provided with a driving member, the driving members being arranged in staggered relation in parallel rows to permit close juxtaposition of said spindles, endless actuating members engaging the respective rows of pulleys operable simultaneously to rotate said painting spindles, a movable carrier having a series of article-supporting spindles movable in a path in parallelism with and in proximity to said painting spindles, and operable to carry the article-supporting spindles from the loading station to and from the painting station and to present said articles to the painting disks, and means for rotating said article-supporting spindles at said painting station.

31. A machine of the class described comprising means for supporting and rotating an article to be decorated, a series of painting spindles each mounted in and extending loosely through the tubular driving member of larger diameter which is journaled in suitable bearings, means flexibly connecting each spindle to its tubular driving member, a painting disk upon the end portion of said spindle, means for guiding the spindles into engagement with the article comprising a plate located in proximity to the painting disk and having guiding slots for directing the painting spindles, and yieldable means acting upon each spindle to maintain uniform light contact between the painting disks and the surfaces of the article.

FORREST G. PURINTON.